(12) United States Patent
Ulrey et al.

(10) Patent No.: US 7,966,984 B2
(45) Date of Patent: Jun. 28, 2011

(54) DIRECT INJECTION FUEL SYSTEM WITH RESERVOIR

(75) Inventors: Joseph Norman Ulrey, Dearborn, MI (US); Eric Matthew Storhok, Ann Arbor, MI (US); Ross Dykstra Pursifull, Dearborn, MI (US); Frank Gonzales, Jr., Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 790 days.

(21) Appl. No.: 11/925,409

(22) Filed: Oct. 26, 2007

(65) Prior Publication Data

US 2009/0107461 A1    Apr. 30, 2009

(51) Int. Cl.
*F02D 41/06* (2006.01)
*F02D 41/04* (2006.01)

(52) U.S. Cl. .................................. 123/179.17; 123/456

(58) Field of Classification Search .................. 123/456, 123/447, 506, 516, 518, 497, 179.16, 179.17, 123/381, 446
See application file for complete search history.

(56) References Cited

U.S. PATENT DOCUMENTS

| | | | |
|---|---|---|---|
| 4,660,531 A | | 4/1987 | Lauterbach et al. |
| 4,667,638 A | | 5/1987 | Igashira et al. |
| 5,007,390 A | * | 4/1991 | Tanaka et al. ............ 123/179.15 |
| 5,327,872 A | | 7/1994 | Morikawa |
| 5,394,844 A | * | 3/1995 | Akimoto .................... 123/179.3 |
| 5,546,912 A | | 8/1996 | Yamada et al. |
| 5,555,872 A | | 9/1996 | Takeuchi et al. |
| 5,598,817 A | * | 2/1997 | Igarashi et al. .......... 123/179.17 |
| 5,651,347 A | | 7/1997 | Oi et al. |
| 5,711,275 A | * | 1/1998 | Minagawa et al. ........... 123/458 |
| 5,794,586 A | * | 8/1998 | Oda et al. ..................... 123/305 |
| 5,832,898 A | | 11/1998 | Wakeman |
| 5,832,900 A | | 11/1998 | Lorraine |
| 5,842,454 A | | 12/1998 | Miwa et al. |
| 5,884,597 A | | 3/1999 | Hiraku et al. |
| 5,918,578 A | * | 7/1999 | Oda ............................. 123/456 |
| 6,024,064 A | | 2/2000 | Kato et al. |
| 6,065,335 A | | 5/2000 | Denz et al. |
| 6,065,436 A | * | 5/2000 | Koga et al. .............. 123/179.17 |
| 6,135,090 A | | 10/2000 | Kawachi et al. |
| 6,142,127 A | | 11/2000 | Maass |
| 6,146,102 A | | 11/2000 | Otome et al. |
| 6,325,051 B1 | * | 12/2001 | Oomori et al. ................ 123/516 |
| 6,367,455 B2 | | 4/2002 | Hirata et al. |
| 6,382,184 B2 | | 5/2002 | Nakamura et al. |
| 6,474,310 B2 | | 11/2002 | Joos et al. |

(Continued)

FOREIGN PATENT DOCUMENTS

EP    0886058    12/1998

(Continued)

*Primary Examiner* — Mahmoud Gimie
(74) *Attorney, Agent, or Firm* — Allan J. Lippa; Alleman Hall McCoy Russell & Tuttle LLP

(57) ABSTRACT

A method of operating a fuel delivery system for an internal combustion engine is described. The method may include, after or during engine shutdown, and during a fuel system cool down, activating the first pump; and varying the activation of the first pump responsive to temperature to maintain a higher pressure for high temperatures. By utilizing the pump to generate increased pressure at an appropriate condition during the cool down, for example, the pressures in the system can be managed to reduce the likelihood of fuel migrating to the rail.

20 Claims, 5 Drawing Sheets

U.S. PATENT DOCUMENTS

| | | |
|---|---|---|
| 6,497,217 B2 | 12/2002 | Kojima |
| 6,651,630 B2 | 11/2003 | Hiraku et al. |
| 6,761,151 B2 * | 7/2004 | Kojima ..................... 123/458 |
| 6,889,656 B1 | 5/2005 | Rembold et al. |
| 6,918,367 B2 | 7/2005 | Denz et al. |
| 6,964,267 B2 * | 11/2005 | Jin ............................. 123/514 |
| 6,988,488 B2 | 1/2006 | Pursifull et al. |
| 7,021,261 B2 | 4/2006 | Joos et al. |
| 7,055,505 B2 | 6/2006 | Washeleski et al. |
| 7,066,126 B2 | 6/2006 | Tokuyasu et al. |
| 7,066,152 B2 | 6/2006 | Stroia et al. |
| 7,093,576 B2 | 8/2006 | Deraad |
| 7,216,614 B2 * | 5/2007 | Shibata et al. ............ 123/179.17 |
| 2004/0250795 A1 | 12/2004 | Stroia et al. |
| 2005/0115533 A1 * | 6/2005 | Okamoto et al. ......... 123/179.16 |
| 2006/0200300 A1 | 9/2006 | Bryan et al. |

FOREIGN PATENT DOCUMENTS

| | | |
|---|---|---|
| EP | 0922850 | 6/1999 |
| JP | 2006348908 | 6/2005 |

* cited by examiner

DIRECT INJECTION FUEL SYSTEM WITH RESERVOIR

BACKGROUND AND SUMMARY

Internal combustion engines may utilize Gasoline Direct Injection (GDI) to increase the power efficiency and range over which the fuel can be delivered to the cylinder. One potential issue with GDI is that under lower injection pressures the fuel may not sufficiently mix with the air in the cylinder. Insufficient mixing may decrease engine power and efficiency, and increase emissions, at least under some conditions. For example, during cold engine starts, and before the catalytic converter is activated, insufficient mixing may exacerbate cold start emissions. Thus, increased injection pressure during a start may be used.

However, fuel delivery systems may also experience compressible gas (air, fuel vapors, etc.) in the fuel line. In particular, a vacuum in the fuel rail may form when the fuel cools during engine-off conditions. The vacuum may cause air to leak through the fuel injectors into the fuel rail. The leakage may create a mixture of air vapor and liquid fuel in the fuel line, which in turn may degrade the fuel pressure rise during engine start up, even if actions are taken to provide increased starting pressure. The degraded pressure rise can diminish air/fuel mixing in the cylinders, thus degrading engine power and increasing potential for engine stalls during start up, each of which may decrease customer satisfaction or degrade engine components. Air can leak in through mechanical components such as injectors but it can also come out of solution in the fuel when the fuel pressure drops. Keeping the fuel rail pressure high or preventing deep fuel rail pressure vacuums minimizes the air coming out of solution. Also, if the fuel rail is entirely filled with liquid, this denies the air in fuel the opportunity to come out of solution.

One approach aimed at providing increase fuel pressure during a start is described in U.S. Pat. No. 5,598,817, which uses two pumps fluidly coupled in series. The first pump may include a lift pump located inside the fuel tank, and the second pump may include a positive displacement pump located upstream of the injectors. A bypass fuel passage and check valve around/through the second pump is used to allow fuel to flow into the fuel rail downstream of the second pump when the operation of the fuel injector is stopped in an attempt to eliminate fuel vapor in the fuel rail leading to the injectors after the engine is turned off. Specifically, the check valve allows fuel to flow into the fuel rail that leads to the injectors when there is a sufficient pressure differential. However, the bypass fuel line itself may contain fuel vapor and/or air when the engine is turned off because a sufficient pressure may not be delivered to the bypass from the lift pump. This situation may allow air or fuel vapor to travel into the fuel rail from the bypass during engine cooling and/or engine starting when the second pump is not yet activated.

One approach to address the above issues may include a method of operating a fuel delivery system for an internal combustion engine, the system including a plurality of direct cylinder injectors, a fuel rail upstream of the injectors, a first pump, and a second pump coupled downstream of the first pump and to the fuel rail. The method comprises: after or during engine shutdown, and during a fuel system cool down, activating the first pump, and varying the activation of the first pump responsive to temperature to maintain a higher pressure for high temperatures. By utilizing the pump to generate increased pressure at an appropriate condition during the cool down, for example, the pressures in the system can be managed to reduce the likelihood of fuel migrating to the rail.

Further, the system may include a bypass fluidly coupled around the second pump having a reservoir and a valve downstream of the reservoir. In this example, the first pump may be activated before inlet pressure of the check valve approaches a vapor pressure of the fuel so that the fuel rail is filled with fuel from the reservoir. This pressure may be inferred in a number of ways including reading the fuel rail pressure sensor.

In still another approach, the system may include a reservoir positioned vertically above a check valve so that any air or vapor that may form in the bypass does not migrate into the rail during engine cool downs. By utilizing a fuel reservoir with a sufficient amount of liquid fuel stored in the bypass around the second pump, liquid (and not vapor) can enter the fuel rail leading to the fuel injectors during the cool down. Of course, this check valve and reservoir may be integrated into the high pressure pump assembly.

Thus, improved fuel pressure rise during subsequent starts may be achieved.

DETAILED SPECIFICATION

Figure 1A:
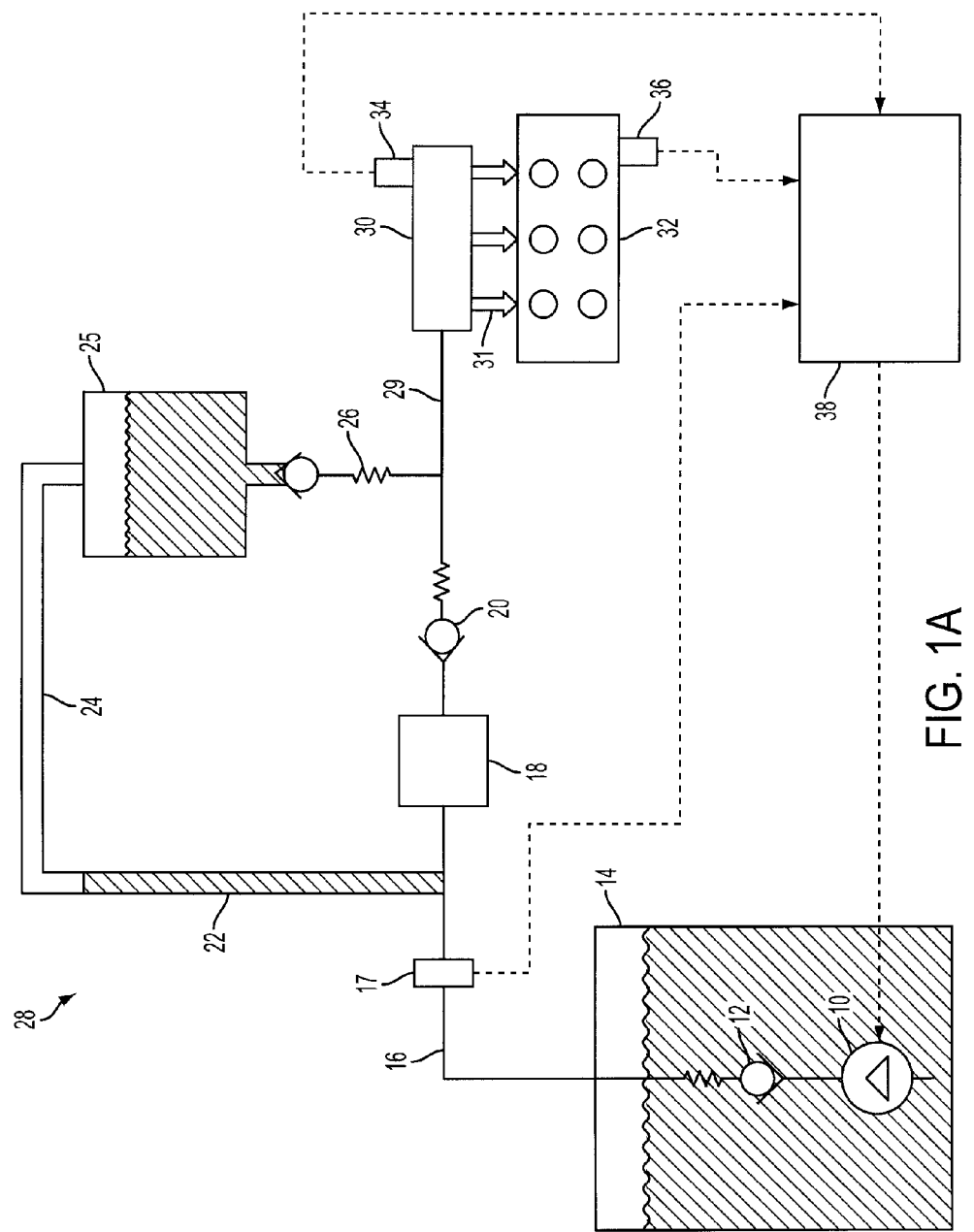
FIG. 1A shows a schematic depiction of a fuel delivery system for an internal combustion engine.

FIG. 1 shows a schematic depiction of a fuel delivery system for an internal combustion engine. Pump 10 may include various types of pumps, such as an electric pump operated at a fixed voltage where an in-tank or near tank regulator sets generated pressure, or an electronically controlled pump which runs at two or more voltage levels based on operating conditions. FIG. 1 shows the configuration for the latter pump. For example, the pump may operate at full power (e.g., 100%) or a reduced power level (e.g., 75%) based on operating conditions. In alternate embodiments the lift pump may run in a variable duty cycle. Controller 38 electronically controls actuation of lift pump 10. Pump 10 is fluidly coupled to check valve 12. In this embodiment check valve 12 is a ball and spring check valve that unseats at a specified pressure differential. In alternate embodiments there may be a series of check valve fluidly coupled to decrease the amount of fuel that leaks through the check valve when it is closed.

Pump 10 and check valve 12 are enclosed by fuel tank 14. The fuel tank may house a variety of fuels such as gasoline, ethanol blends, or diesel. Fuel line 16 extends out of the gas tank fluidly coupling check valve 12 to pump 18 and fuel line 22. Optional sensor 17 may be coupled to fuel line 16. In this embodiment sensor 17 measures the pressure of the fuel in fuel line 16. In alternate embodiments sensor 17 could measure the temperature in fuel line 16, which may be correlated to pressure in controller 38. Fuel line 16 is fluidly coupled to fuel pump 18, which is fluidly coupled to check valve 20. In this embodiment the fuel pump is a positive displacement pump that includes a mechanism for varying the volume of fuel that it can provide. Fuel pump 18 contains an electronically-controlled inlet check valve that modulates the volume displaced by the pump. Check valve 20 prevents fuel rail pressure from driving fuel backwards through the fuel pump 18. In this embodiment the check valve includes a plate and spring mechanism (schematically-represented by the industry-standard check ball and spring icon). In alternate embodiments there may be a series of check valve fluidly coupled to decrease the amount of fuel that leaks through the check valve when it is closed. Fuel line 29 fluidly couples check valve 20 to fuel rail 30.

Fuel rail 30 is fluidly coupled the fuel injectors 31. In this embodiment the fuel injectors include direct cylinder injectors. In alternate embodiment the fuel injectors may be port fuel injectors, or combinations of port and direct injectors. The fuel injectors supply fuel at a controllable, variable pressure to engine 32. In this embodiment engine 32 has 6 cylinders. In alternate embodiments other number of cylinders may be used.

Bypass 28 is fluidly coupled to fuel line 16 and fuel line 29. The bypass allows fuel to travel around pump 18 and check valve 20 under certain conditions. Bypass 28 includes fuel line 22, fuel line 24, fuel reservoir 25, and check valve 26. In an alternative embodiment, the check valve may be replaced by an orifice, or still further, both an orifice and check valve may be used in series or in parallel with one another. A portion of the fuel line 24 extends above reservoir 25 in relation to the ground as shown by FIG. 1. The reservoir is positioned vertically above check valve 26, which is positioned vertically above fuel pump 18 and check valve 20, in relation to level ground.

Controller 38 is electronically coupled to sensor 17, fuel rail pressure sensor 34, and an engine temperature sensor 36. The controller may receive and store signals from these various sensors.

Under certain conditions, air or fuel vapor may accumulate in this section of the fuel bypass line, and may be referred to herein as an air column. The air column may include sections of fuel line 22 and the fuel reservoir. The air column may be a byproduct of the liquid volume contracting upon cooldown. By the configuration shown in FIG. 1A, any vapor or air leakage into the fuel system forms an air column outside the fuel rail. Further, by this configuration, the air column is not ingested into the fuel rail upon engine re-start.

The fuel reservoir may include any structure that is sufficient for storing a volume of fuel that can positively pressurize fuel line 29 when the temperature of the engine is approaching the ambient temperature. Further, the fuel reservoir may have a volume sufficient to provide enough liquid fuel to the fuel rail during engine starting where fuel may bypass the high pressure pump. In alternate embodiment the fuel reservoir may be formed of extended lengths and/or diameter of line 24 to sufficiently pressurize fuel line 29 when the temperature of the engine approaches the ambient temperature during engine off conditions. In this embodiment check valve 26 is a ball and spring mechanism that unseats at a specified pressure of 2 PSI. In this way, the pressure differential may be reduced to expand the conditions under which liquid fuel flows into the fuel rail as the liquid fuel volume already in the fuel rail contracts with declining temperature. In alternate embodiments the pressure differential may be adjusted to account for fuel composition or system requirements, or other valve structures may be used.

The engine can operate in a variety of modes depending on certain operating conditions. The modes include a starting mode, a normal mode, an idle mode, and a shut down mode, for example.

When the lift pump 10 is first energized (e.g., before the high pressure pump 18 is actuated) any fuel vapor in the system is collapsed and the air is compressed. Any compressed air between the high pressure pump 18 and the injectors 31 impedes the ability of the positive displacement pump 18 to raise the fuel rail pressure. During the key-off period, the reservoir and check valve arrangement cause the fuel rail to ingest liquid fuel and reduces or eliminates air ingestion or air coming out of solution in the fuel rail.

When the engine is running and the pump 18 is deactivated, the fuel flow travels through elements 22, 24, 25 and 26. When the engine is injecting and the pump 18 is increasing fuel rail pressure, the fuel flow travels through the pump 18. When the engine is in a starting mode, the lift pump may be operated (while the high pressure pump is not yet operable) to generate the fuel pressure rise for the initial fuel injections to start the engine. In this mode, fuel may be delivered from the lift pump around the bypass to the fuel rail. Alternatively, fuel may be delivered through a check valve in the high pressure pump. When the lift pump is operated for an extended duration (e.g., 20 minutes) the air contained in pockets in the fuel system is dissolved into the liquid fuel. Thus, in a typical key-off situation, the system is entirely full of liquid at the instant of key-off. Subsequent fuel cool-off tends to cause air and vapor spaces to form.

While the above configuration of FIG. 1A may be used to address vapor generation and/or air leakage into the fuel rail, additional/alternative actions may be performed during engine shut down operation. For example, when the operation of the engine has been disabled, a shut down mode may be initiated. The shut down mode may be initiated to increase the pressure in fuel line 29 to prevent or reduce the likelihood of air leaking into the fuel line through the injectors when the engine operation has been stopped and the fuel system cools to ambient. In one example, the controller turns the lift pump on and then off based on temperature (e.g., engine coolant temperature), rail pressure, time since shut-down, and/or combination thereof. Various actions may performed by the controller to push fuel through the bypass and increase the fuel pressure in fuel line 29, such as those actions described with regard to FIGS. 2-5.

Figure 1B:
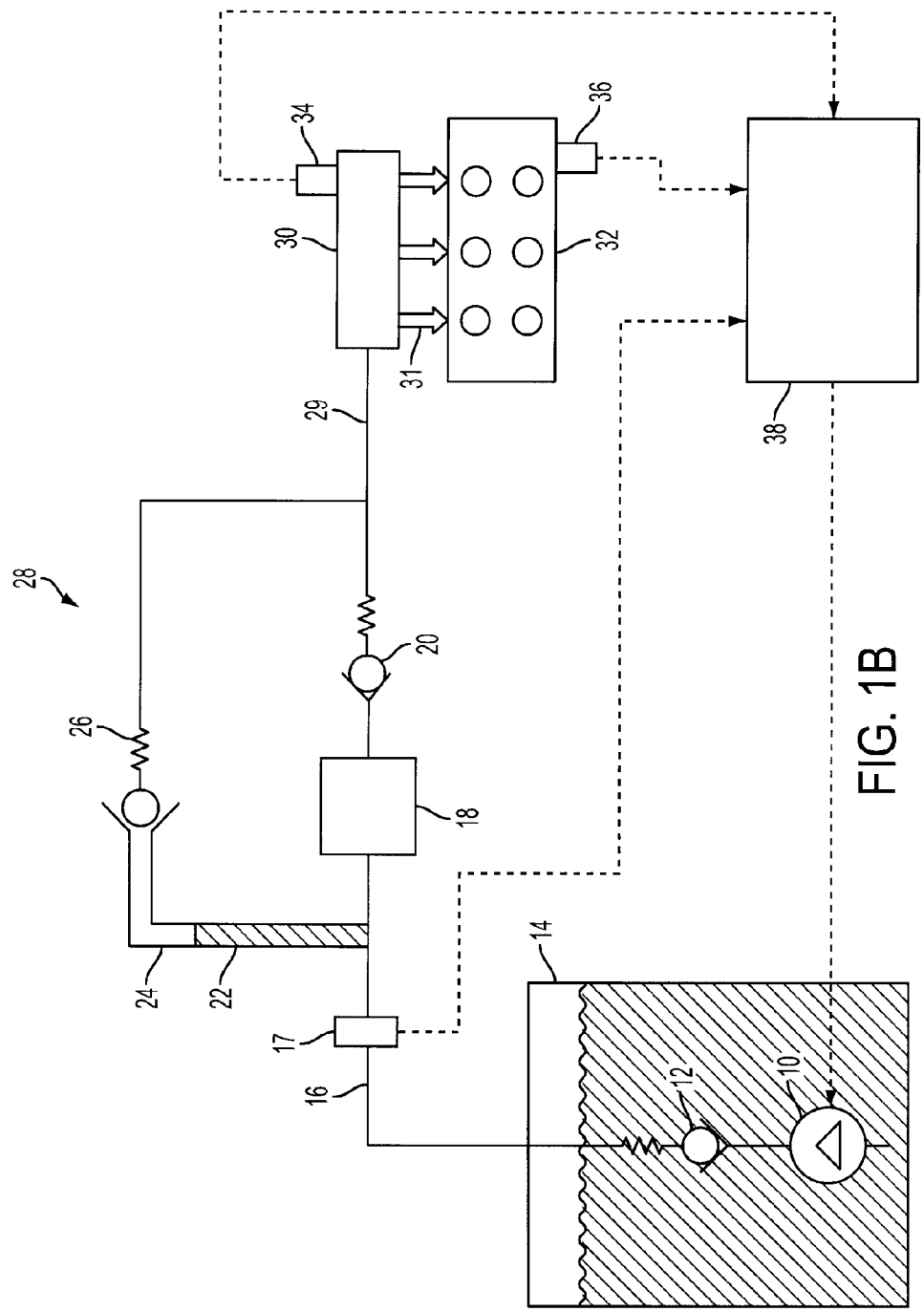
FIG. 1B shows an alternate schematic depiction of a fuel delivery system for and internal combustion engine.
Figure 4:
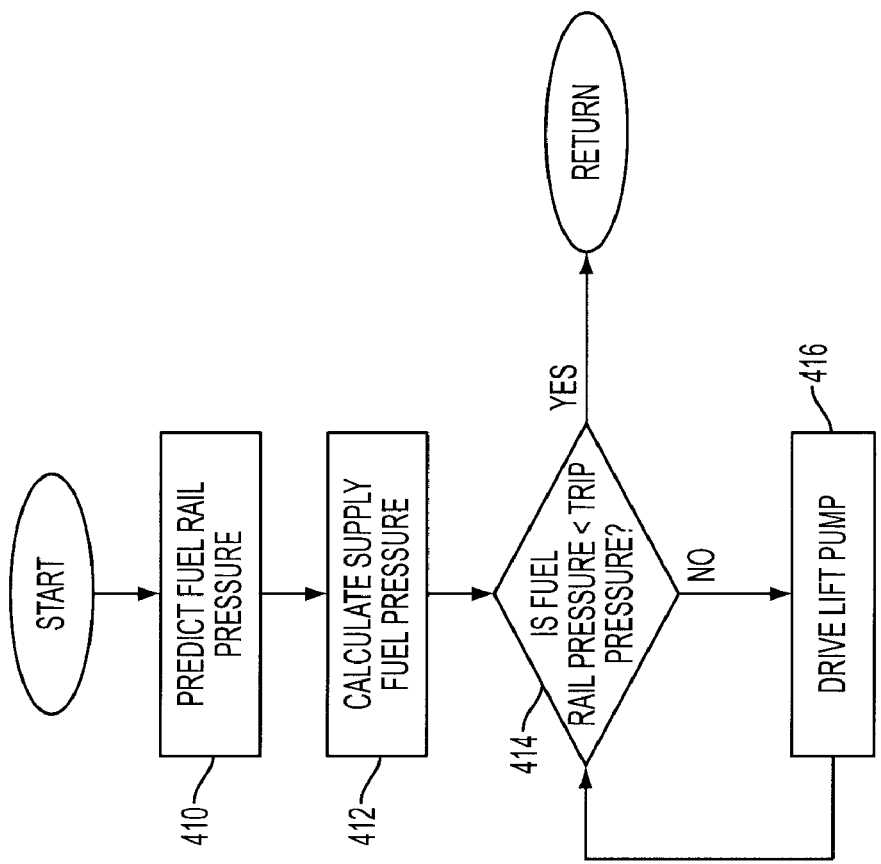
FIGS. 3-5 show example high level routines of fuel system operation during an engine shut down.
Figure 3:
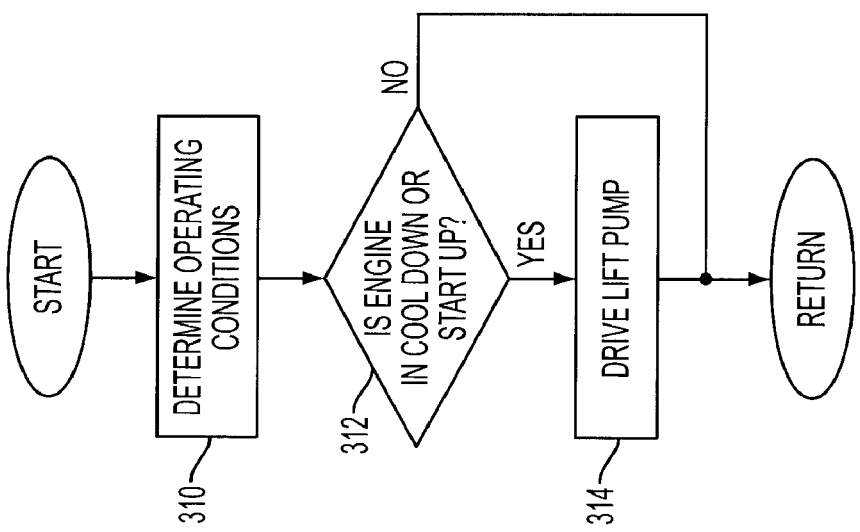
Figure 5:
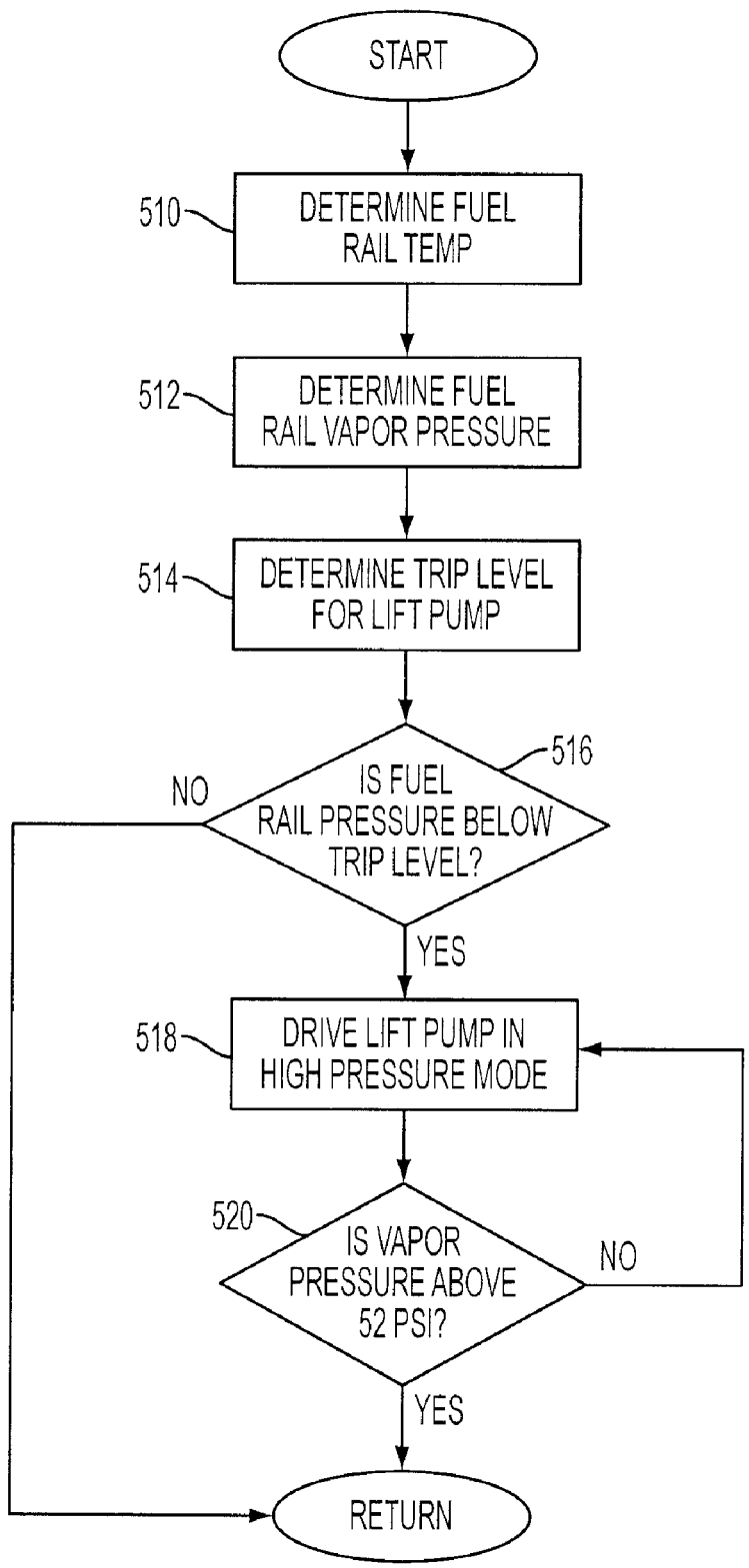

FIG. 1B shows an alternative fuel system configuration that may also be used with the shutdown routines of FIGS. 3-5. However, the configuration of FIG. 1B may have a greater likelihood of air ingestion and/or vapor generation in the fuel rail. Specifically, FIG. 1B shows a schematic depiction of an alternative fuel system labeled with like components having a like number as compared to FIG. 1A. One distinction between the systems of FIGS. 1A and 1B includes the location of the check valve in the bypass. In FIG. 1B check valve 26 is located at a high, or the highest, point in the fuel line, with respect to the ground, while in FIG. 1A check valve 26 is located at a lower point, with respect to the ground, than check valve 26 in FIG. 1B.

Fuel vapor or air may develop in the bypass of FIGS. 1A and 1B due to a variety of conditions that may occur during operation of the fuel system. When the fuel vapor and air develops it travels to the highest point in the fuel line 24. In FIG. 1B, when the shut down mode is initiated the fuel vapor/air travels through check valve 26 into fuel line 29. During subsequent start ups the fuel injectors may experience a degraded pressure rise due to air and fuel vapor reaching the fuel rail and/or injectors, which can diminish air/fuel mixing in the cylinders. Decreased mixing may decrease engine power and increase potential for engine stalls during start up, each of which may decrease customer satisfaction or degrade engine components. The configuration of FIG. 1A, for example, addresses this situation at least in part by lowering the relative elevation of check valve 26 and adding reservoir 25 that allows an increased amount of fuel to be stored in the bypass. These features enable sufficient liquid fuel, and not air or fuel vapor, to enter fuel line 29 when the fuel delivery system is in a shut down and start up mode. Nevertheless, additional or alternative measures may be taken to further address vapor generation in the fuel rail during engine cool-down conditions, such as described with regard to FIGS. 2-5.

Figure 2A:
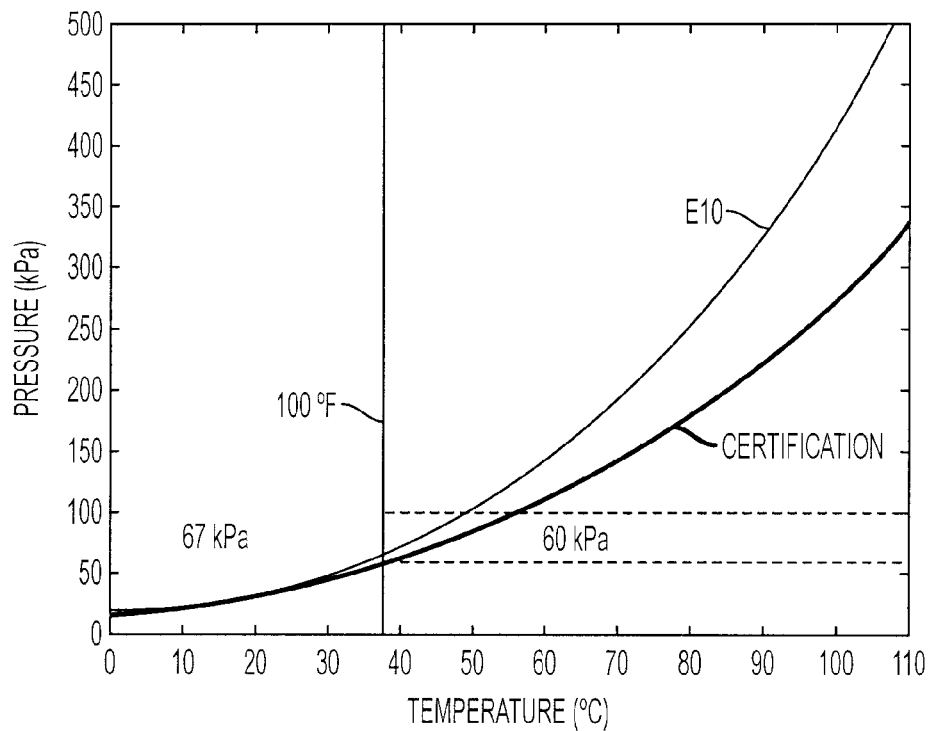
FIGS. 2A and 2B show graphs of pressure vs. temperature for a test fuel enclosed in the fuel rail.

FIG. 2A shows a graph of the relationship vapor pressure and temperature of a certification fuel and a test fuel E10. On the y-axis is pressure and on the x-axis is temperature. The certification fuel is a standard US fuel composition defined by the E.P.A. The certification fuel composition closely matches standard gasoline blends that an individual may obtain at a gas station in the U.S. E10 is a type of gasoline that contains ten percent ethanol. The pressure of E10 is slightly higher than the certification fuel at the same temperature. Line 212 represents the E10 fuel blend and line 214 represents the certification fuel. The equation used to plot the certification fuel is $$P = 10^{-1230°K} \left( \frac{1}{T} - \frac{1}{311° \text{ K}} \right) \cdot 60 \text{ } kPA \tag{1}$$

This graph illustrates the process the controller may use to correlate the temperature of the fuel enclosed in fuel rail 29 to the vapor pressure of the fuel enclosed in the fuel lines. The controller may correlate the cylinder head temperature to the fuel rail temperature. In this embodiment the cylinder head temperature and the fuel rail temperature are closely related and are nearly isothermal during most of the key-off period. In alternate embodiments a more detailed method of thermal analysis may be employed to predict the temperature of the fuel rail. After the temperature of the fuel rail has been established, the fuel rail temperature is then entered into equation 1 where the pressure in the fuel rail is calculated.

Figure 2B:
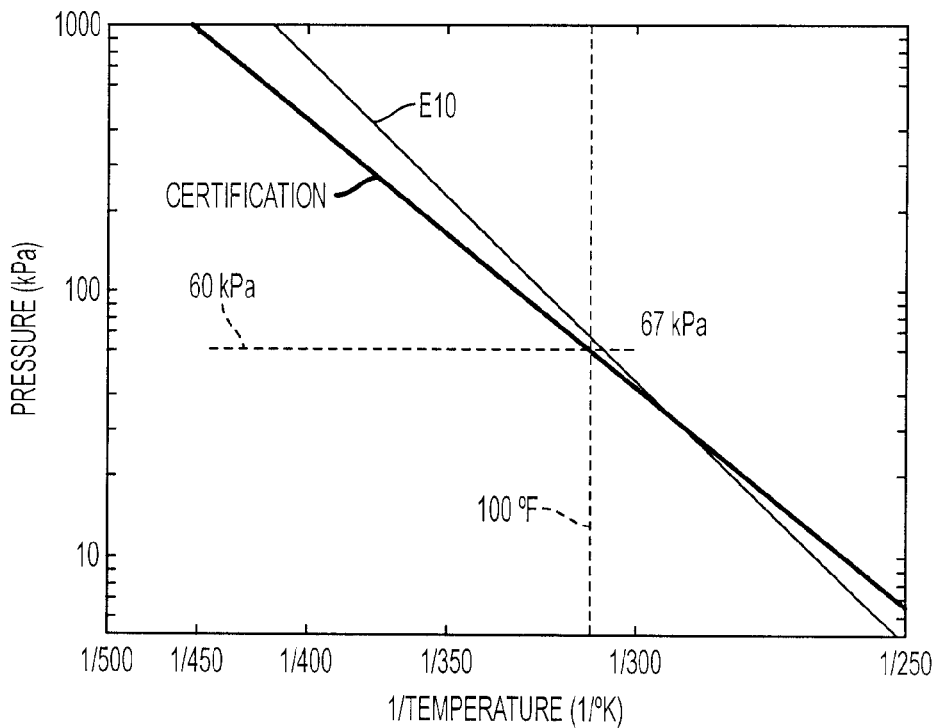

FIG. 2B shows a graph of the relationship between pressure and temperature of the certification fuel and the E10 fuel on a logarithmic axis resulting in the very same curve appearing as a straight line. The E10 fuel is represented by line 216 while the certification fuel is represented by line 218. The graph represents an alternate embodiment of how the controller might correlate the temperature of the fuel enclosed in fuel line 29 to the vapor pressure of the fuel enclosed in the fuel lines.

Referring now to FIGS. 3-5, various embodiments of example routines are shown for controlling fuel pump operation during engine shut down, which may include engine off, operation. These routines can be used with the fuel system of FIG. 1A, and/or the fuel system of FIG. 1B. In some examples, the routines generate operation that simulates the effect of an accumulator in the fuel rail by powering the lift pump during engine off conditions. The increased pressure reduces fuel vapor generation and/or air leakage into the rail during engine off, and subsequent engine starting, conditions. Various approaches are described for operation of the fuel pump during engine off operation, including, for example, operating the pump one or more times at selected engine off operating conditions during the engine cool down. Further, pump operation may be responsive to fuel rail pressure, inferred fuel temperature and measured fuel pressure, and/or others. In one particular embodiment, the higher the temperature, the higher the system maintains fuel rail pressure. In this way, sufficient pressure may be obtained to reduce vapor generation, without excessive pump operation.

FIG. 3 shows a flow chart which depicts a routine carried out by the controller for operating the lift pump once the operation of the engine has been stopped. At 310 the routine determines engine operating conditions. The operating conditions may include the engine temperature, fuel rail temperature, engine temperature, fuel pressure in fuel line 16, injection pressure, ambient temperature, and amount of fuel in fuel tank.

The routine then proceeds to 312 where it is determined whether or not the engine has been turned off or engine ignition has been initiated. If it is determined that the engine has not been turned off or ignition has not be initiated, the routine returns to the start.

On the other hand, if it is established that the ignition has been turn off the routine proceeds to 314 where the lift pump is driven. In this embodiment the lift pump is driven for 300 milliseconds. In other embodiments the time that the lift pump is driven may vary depending on operating conditions such as ambient temperature, injector temperature, fuel pressure, and fuel temperature. The routine then returns to the start.

FIG. 4 shows an alternate embodiment of a flow chart that depicts a routine carried out by the controller for operating the lift pump once the operation of the engine has been stopped or ignition has been initiated. At 410 the fuel vapor pressure is predicted. The prediction of the pressure is modeled with the existing temperature input of the cylinder head temperature or the fuel rail temperature, shown in FIG. 2A and FIG. 2B. For example when certification fuel is used in the engine the temperature measured from either the cylinder head or the fuel rail is inserted into equation 1 to predict the fuel vapor pressure.

The routine then proceeds to 412 where the supply fuel pressure is calculated. The supply fuel pressure is the pressure of the fuel upstream of check valve 26 in fuel line 16, fuel line 22, and reservoir 25. This pressure is calculated using equation 2 below $$\text{Supply\_Pressure} = \text{Rail\_Pressure} + \text{Check\_Valve\_Pressure\_Drop} \tag{2}$$

The fuel rail pressure may be measured by a sensor located in the fuel rail. The Check_Valve_Pressure_Drop is governed by the mechanism of the check valve. In this embodiment the Check_Valve_Pressure_Drop is 11 PSI. In alternate embodiments the pressure drop may be altered. In some embodiments the supply fuel pressure may be measured by sensor 17 coupled to fuel line 16.

The routine then proceeds to 414 where it is determined if the fuel vapor pressure is less than the trip pressure. The trip pressure refers to the supply pressure which is the pressure upstream of check valve 26 in fuel line 16 and fuel line 22. Operation of the lift pump 10 is initiated when predicted vapor pressure drops below the trip pressure. In this embodiment the trip pressure may range between 10 PSI and 30 PSI depending on the temperature of the fuel. In this embodiment when the fuel line temperature is between 150-200 degrees Fahrenheit, the trip pressure is set at 30 PSI. If the fuel line temperature is between 100-150 degrees Fahrenheit, the trip pressure is set at 20 PSI. If the fuel line temperature is between 50-100 degrees Fahrenheit, the trip pressure is set at 10 PSI. In other embodiments the engine temperature may be used instead of the fuel line temperature. Further, the trip pressure may be altered to account for different types of fuel that may be used in the fuel delivery system such as ethanol blends, methanol blends, diesel, or bio-diesel. These values may be increased or decreased to coincide with the composition and chemical properties of the fuel in use. These properties may be determined by a sensor (not shown) located in the fuel tank or may be preset in the controller located in the engine based feedback from exhaust gas oxygen sensors, for example.

If the answer to 416 is yes, the routine returns to the start. However if it is determined that the supply pressure is less than the fuel vapor pressure then the routine proceeds to 418 where the routine drives the lift pump at the higher level (e.g., full power) for 300 milliseconds. In one example, between 5 and 10 cubic centimeters of fluid is delivered to the fuel line when the lift pump is driven at the higher level. In alternate embodiments the lift pump may be driven multiple times at specified time intervals. After the lift pump is driven the routine moves to 416.

FIG. 5 shows an alternate embodiment of a flow chart which depicts a routine carried out by the controller for operating the lift pump once the operation of the engine has been stopped or ignition has been initiated.

At 510 the routine determines the temperature of the fuel rail. The fuel rail temperature is determined in the controller which correlates the fuel line temperature to the cylinder head temperature which is measured by a sensor in the engine (not shown). In alternate embodiment the fuel rail temperature may be measured by a sensor coupled to the fuel rail.

The routine then proceeds to 512 where the controller correlates the fuel rail temperature with the vapor pressure. This correlation is depicted graphically in FIG. 2A and FIG. 2B.

The routine then proceeds to 514 where the trip pressure is set. If a standard gasoline is used as the fuel, the pump trip pressures are as follows: If the temperature is between 150 and 200 degrees Fahrenheit, the trip pressure is at 30 PSI. If the temperature is between 100 and 150 degrees Fahrenheit, the trip pressure is 20 PSI. If the temperature is between 50 and 100 degrees Fahrenheit, the trip pressure is at 10 PSI.

The routine then proceeds to 516 where it is determined in the controller whether the vapor pressure is below the trip pressure. If the vapor pressure is not below the trip pressure then the routine returns to the start.

However, if the vapor pressure is below the trip pressure, then the routine advances to 518 where the lift pump may be driven for 300 milliseconds. In alternate embodiments the period of time that the lift pump is driven may be changed depending on the amount of pressure that can be delivered to the bypass by the lift pump. The routine then proceeds to 520 where it is determined in the controller whether the pressure in fuel line 29 and/or fuel rail 30 has reached 52 PSI. If the pressure has not reached 52 PSI, then the routine returns to 518 and drives the lift pump again. If the pressure has reached 52 PSI then the routine returns to the start. In other embodiments the pressure in the fuel line may be modified to account for an increase or decrease in demand for pressure from the fuel injectors during engine start ups.

The above examples illustrate operation that may be used to reduce the likelihood of air and/or fuel vapor migrating to the fuel rail. In this way, the fuel rail contains substantially only liquid fuel, such that during a subsequent start, liquid fuel is delivered to the cylinders via the injectors, and a sufficient pressure rise can be achieved.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a fuel delivery system for an internal combustion engine, the system including a plurality of direct cylinder injectors, a fuel rail upstream of the injectors, a first pump, and a second pump coupled downstream of the first pump and coupled to the fuel rail, comprising:
    after or during engine shutdown, and during a fuel system cool down, activating the first pump; and
    varying the activation of the first pump responsive to temperature to maintain a higher pressure for high temperatures, including operating the first pump when a measured or predicted pressure upstream of the fuel injectors is below a trip pressure, the trip pressure decreasing with a decreasing temperature.

2. The method of claim 1 further comprising: during a subsequent engine start and before activation of the second pump, pressurizing fuel in the fuel rail via the first pump, where the activating of the first pump is performed during engine off and key-off conditions.

3. The method of claim 1 further comprising: after or during engine shutdown, when the engine is between 150 and 200 degrees Fahrenheit, and a pressure of the fuel contained in the fuel rail has dropped below 30 PSI, operating the first pump for 300 milliseconds;
    when the engine is between 100 and 150 degrees Fahrenheit, and the pressure of the fuel contained in the fuel rail has dropped below 20 PSI, operating the first pump for 300 milliseconds; and
    when the engine is between 50 and 100 degrees Fahrenheit, and the pressure of the fuel contained in the fuel rail has dropped below 10 PSI, operating the first pump for 300 milliseconds.

4. The method according to claim 1 further comprising determining a vapor pressure based on the temperature of the engine;
    wherein the timing, duration and/or level of pump activation during engine off vary with the temperature of the engine.

5. The method according to claim 1 further comprising determining a vapor pressure based on an ambient temperature;
    wherein the timing, duration and/or level of pump activation during engine off vary with the ambient temperature.

6. The method according to claim 1 further comprising estimating inlet pressure of a check valve coupled in the fuel system based on operating conditions and estimating vapor pressure of the fuel, said pump activated before inlet pressure of the check valve approaches the estimated vapor pressure of the fuel.

7. The method of claim 1, wherein the decreasing temperature is a decreasing ambient temperature.

8. The method of claim 1, wherein the decreasing temperature is a decreasing engine temperature.

9. A fuel delivery system for an internal combustion engine, comprising;
   a plurality of direct cylinder injectors;
   a fuel rail upstream of the injectors;
   a first pump;
   a second pump coupled downstream of the first pump and to the fuel rail;
   a bypass fluidly coupled around the second pump, the bypass having a valve or orifice downstream of a fuel reservoir, where the valve or orifice is positioned vertically above the second pump and the fuel reservoir is positioned vertically above the valve or orifice, the fuel reservoir sized to hold a sufficient amount of fuel in the bypass to allow fuel to migrate from the bypass to the fuel rail during engine cool down.

10. The system of claim 9 wherein a volume enclosed in the fuel reservoir is larger than a decrease in volume of fuel located in the fuel rail and fuel line downstream of the second pump, the decrease caused by cooling after the engine has been shut down.

11. The system of claim 9 where the bypass is coupled between the first and second pump and between the second pump and the fuel rail, where the valve is located in the bypass.

12. The system of claim 11 further comprising a controller capable of electronically actuating the first pump in at a high level after or during engine shutdown, and during the cool down, where the pump is actuated before inlet pressure of the valve approaches a vapor pressure of the fuel.

13. The system of claim 10 wherein the valve unseats at approximately 11 PSI.

14. The system of claim 9 where the first pump is electrically controlled.

15. The system of claim 12 wherein the controller operates the first pump:
   when the inlet pressure of the valve has dropped below 30 PSI and a temperature of the fuel rail is between 150 and 200 degrees Fahrenheit,
   when the inlet pressure of the valve has dropped below 20 PSI and a temperature of the fuel rail is between 100 and 150 degrees Fahrenheit, or
   when the inlet pressure of the valve has dropped below 10 PSI and a temperature of the fuel rail is between 50 and 100 degrees Fahrenheit.

16. The system of claim 9 wherein a vapor pressure is determined based on ambient temperature.

17. The system of claim 9 wherein a vapor pressure is determined based on engine temperature.

18. The system of claim 9 where the valve is a check valve allowing flow toward the fuel rail from the bypass when a pressure in the bypass exceeds fuel rail pressure by a predetermined threshold.

19. The system of claim 18 further comprising a second check valve coupled upstream of the second pump, and in parallel to the bypass, the second check valve allowing flow toward the fuel rail from the second pump when a pressure upstream of the second check valve exceeds fuel rail pressure by a preselected threshold.

20. A method of operating a fuel delivery system for an internal combustion engine, the system including a plurality of direct cylinder injectors, a fuel rail upstream of the injectors, a first pump, a second pump coupled downstream of the first pump and to the fuel rail and a bypass fluidly coupled around the second pump having a reservoir and a valve downstream of the reservoir, comprising:
   during engine-off conditions and during a fuel system cool down, activating the first pump before inlet pressure of the check valve approaches a vapor pressure of the fuel so that the fuel rail is filled with fuel from the reservoir, where the bypass reservoir is sized and positioned vertically above the valve to provide sufficient fuel for allowing fuel to be drawn into the rail during the cool down;
   during an engine start and before activation of the second pump:
      pressurizing fuel in the fuel rail via the first pump; and
      delivering fuel to the injectors from the first pump around the second pump via the bypass;
   after activation of the second pump:
      delivering fuel to the injectors from the first and second pump without passing through the bypass; and
      replenishing fuel storage in the reservoir.

* * * * *